Patented June 16, 1936

2,044,292

UNITED STATES PATENT OFFICE 2,044,292

ZINC DUST PAINT

Lester D. Grady, Jr., Palmerton, Pa., assignor to The New Jersey Zinc Company, New York, N. Y., a corporation of New Jersey No Drawing. Application September 6, 1933, Serial No. 688,357

7 Claims. (Cl. 134—76)

This invention relates to zinc dust paints and has for its object the provision of certain improvements in making such paints as well as the production of an improved zinc dust paint.

Zinc dust paints as heretofore prepared, containing zinc dust and an oil vehicle such as linseed oil, suffer under the disadvantage that hydrogen gas is evolved by reaction between the zinc dust and certain constituents of the paint. This hydrogen gas frequently causes the sealed containers in which such zinc dust paints must be kept to explode or leak during storage or shipment. The present invention contemplates a zinc dust paint (and a method of preparing same) which does not evolve sufficient hydrogen during storage to give rise to this difficulty.

I have found that the source of the hydrogen evolved in these paints is the reaction of the metallic zinc of the zinc dust with water present either in the constituents of which the paint was compounded or formed during storage by the reaction of zinc oxide (either added as such or present in the zinc dust) with the free fatty acids in the linseed oil or other oil vehicle used in compounding the paint. Thus, water may be formed in zinc dust paint by the following reaction:

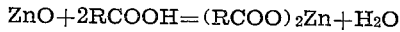
$$ZnO + 2RCOOH = (RCOO)_2Zn + H_2O$$

in which equation RCOOH symbolizes the free fatty acid present in the linseed oil or other oil vehicle. The water formed by this reaction then reacts with zinc in the zinc dust to evolved hydrogen as follows:

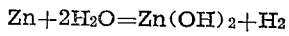
$$Zn + 2H_2O = Zn(OH)_2 + H_2$$

It has heretofore been supposed that the source of the hydrogen evolved during the storage of zinc dust paints has been a direct reaction of zinc in the zinc dust with free fatty acids, as follows:

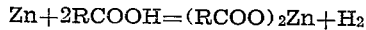
$$Zn + 2RCOOH = (RCOO)_2Zn + H_2$$

I have found that while this reaction may occur to some extent, the source of the greater part of the hydrogen evolved during the storage of these paints is the reaction of zinc with water.

The present invention contemplates the retardation of the evolution of hydrogen by introducing a hygroscopic or water-absorbent substance into zinc dust paints. The substance used is preferably added to the zinc dust before its incorporation in the paint, but it may be added separately to the paint. Preferably, a moderately hygroscopic substance is used since intensively hygroscopic substances tend to become saturated or nearly saturated with water while they are being added to the zinc dust or before the zinc dust is incorporated in the paint vehicle so that such substances are ineffective in combining with the water subsequently produced in the paint by the reaction of zinc oxide present with the free fatty acids in the paint vehicle.

Among the moderately hygroscopic or water-absorbent substances that I have found effective for the purposes of the invention are quick lime (calcium oxide) barium oxide and activiated bauxite, which is commonly prepared by heating bauxite ($Al_2O_3.2H_2O$) to temperatures between 350 and 700° C. These water-absorbent substances may advantageously be added to and mixed with the zinc dust in amounts varying from about 0.25 to 1% by weight on the weight of zinc dust. Quick lime (calcium oxide) is satisfactory in every respect for the practice of the invention. The quick lime should be smooth enough and of sufficiently fine particle size to mix with the zinc dust without producing deterioration of texture. Care should be taken that the quick lime does not become slacked by atmospheric moisture before addition to the zinc dust or before incorporation of the zinc dust in the paint. It is my present preferred practice to add 0.5% of quick lime to the zinc dust prior to its incorporation in the zinc dust paint.

Zinc dust thus admixed with quick lime and incorporated in paint does not evolve sufficient gas to break or create leaks in the usual sealed paint can during any normal period of storage. Quick lime, barium oxide and activated bauxite do not become prematurely saturated with water if used while fresh in the normal course of manufacture of zinc dust paints. Paints made in accordance with the invention may be kept in the usual sealed paint containers or cans. The use of rubber gaskets, for example, in order to permit the escape of evolved hydrogen is not necessary in packing zinc dust paints prepared in accordance with the invention.

I claim:

1. A zinc dust oil paint containing a small amount of a water absorbent substance selected from the group consisting of calcium oxide, barium oxide and activated bauxite.

2. A zinc dust oil paint containing about 0.25 to 1 per cent of calcium oxide by weight on the weight of zinc dust in the paint.

3. In the manufacture of zinc dust oil paint, incorporating in the paint a small amount of a water absorbent substance selected from the group consisting of calcium oxide, barium oxide and activated bauxite.

4. In the manufacture of zinc dust oil paint, incorporating in the paint zinc dust containing about 0.25 to 1 per cent by weight of calcium oxide.

5. A zinc dust oil paint containing a small amount of a water absorbent metallic oxide.

6. In the manufacture of zinc dust oil paint, incorporating into the paint a small amount of a water absorbent metallic oxide.

7. A method of retarding the evolution of hydrogen during the storage of zinc dust oil paints, said evolution being due to the reaction of metallic zinc in the zinc dust with water formed by reaction of zinc oxide in the zinc dust with free fatty acids in the oil, which comprises incorporating into the paint prior to storage a solid substance capable of holding the water by chemical combination or adsorption and preventing its reaction with the metallic zinc in the zinc dust, said substance having substantially no chemical affinity for zinc dust at the temperature at which zinc dust oil paint is usually stored.

LESTER D. GRADY, JR.